United States Patent [19]

Doshi et al.

[11] Patent Number: 4,863,492
[45] Date of Patent: Sep. 5, 1989

[54] INTEGRATED MEMBRANE/PSA PROCESS AND SYSTEM

[75] Inventors: Kishore J. Doshi, Somers, N.Y.; Robert G. Werner, Danbury, Conn.; Michael J. Mitariten, Peekskill, N.Y.

[73] Assignee: UOP, Des Plaines, Ill.

[21] Appl. No.: 276,793

[22] Filed: Nov. 28, 1988

[51] Int. Cl.$^4$ .................. B01D 53/22; B01D 53/04
[52] U.S. Cl. ........................................... 55/16; 55/21; 55/25; 55/68; 55/158; 55/212; 55/218; 55/270; 55/389
[58] Field of Search ............... 55/16, 18, 21, 25, 26, 55/62, 68, 75, 158, 179, 210, 212, 218, 212, 274, 389

[56] References Cited

U.S. PATENT DOCUMENTS

| | | | |
|---|---|---|---|
| 3,430,418 | 3/1969 | Wagner | 55/62 X |
| 3,986,849 | 10/1976 | Fuderer et al. | 55/25 |
| 4,229,188 | 10/1980 | Intille | 55/16 |
| 4,238,204 | 12/1980 | Perry | 55/16 |
| 4,398,926 | 8/1983 | Doshi | 55/16 |
| 4,421,529 | 12/1983 | Revak et al. | 55/21 X |
| 4,639,257 | 1/1987 | Duckett et al. | 55/16 |
| 4,645,516 | 2/1987 | Doshi | 55/26 X |
| 4,690,695 | 9/1987 | Doshi | 55/26 X |
| 4,701,187 | 10/1987 | Choe et al. | 55/26 X |
| 4,765,804 | 8/1988 | Lloyd-Williams et al. | 55/25 X |
| 4,772,295 | 9/1988 | Kato et al. | 55/16 |
| 4,783,203 | 11/1988 | Doshi | 55/26 X |
| 4,806,132 | 2/1989 | Campbell | 55/18 X |

FOREIGN PATENT DOCUMENTS

| | | | |
|---|---|---|---|
| 0013329 | 3/1982 | Japan | 55/21 |
| 62-153389 | 7/1987 | Japan | 55/16 |
| 62-153390 | 7/1987 | Japan | 55/16 |
| 62-167390 | 7/1987 | Japan | 55/16 |
| 62-273025 | 11/1987 | Japan | 55/16 |
| 63-182019 | 7/1988 | Japan | 55/16 |

Primary Examiner—Robert Spitzer
Attorney, Agent, or Firm—Thomas K. McBride; John G. Tolomei

[57] ABSTRACT

A gas separation process and system for integrating a gas permeable membrane system with a multiple bed pressure swing adsorption system to produce a mixed gas product having a preset adjustably controlled gas ratio and a high purity second gas component. The permeate stream from the gas permeable membrane system is fed to the PSA unit and the tail gas from the PSA unit is compressed and blended with the non-permeate stream to form the mixed gas product. The pressure of the permeate stream is controlled to adjustably control the gas ratio of the mixed gas product.

14 Claims, 1 Drawing Sheet

INTEGRATED MEMBRANE/PSA PROCESS AND SYSTEM

FIELD OF INVENTION

This invention relates to a gas separation process and system which integrates a gas permeable membrane system with a multiple bed pressure swing adsorption ("PSA") system for producing a mixed gas product having a preset adjustably controlled gas ratio.

BACKGROUND OF INVENTION

In many processes a multi component feedstream is applied as feedstock to a separation system for selective recovery of one or more of the components. It may also be desirable to recover a mixture of feedstream components in a specific mole ratio to one another. For example, in the production of oxo-alcohol, a synthesis gas mixture of hydrogen and carbon monoxide is required to be applied as feed gas in a controlled ratio of 1:1 of hydrogen to carbon monoxide. A synthesis gas consisting of hydrogen and carbon monoxide is available as a low quality effluent from a partial oxidation or steam reformer but in a ratio which may vary in a range between 1.2 to 4.0 moles hydrogen to 1 mole carbon monoxide.

A gas permeable membrane system may be used as a stand alone system to preferentially permeate one of the gas components from a multi component gas stream, e.q., hydrogen may be preferentially separated from a multiple component gas stream containing hydrogen. The less permeable gas components will consist of a gas mixture including hydrogen. The operation of the membrane system may be selectively adjusted so that the syngas stream is derived from the less permeable product stream, i.e., where the ratio of hydrogen to carbon monoxide in the non-permeate stream satisfies the desired syngas ratio. However, the gas membrane will pass a portion of less permeable gases along with the preferentially separated gas. To operate a gas membrane system which produces a low quality permeate reject stream of hydrogen and less permeable gases is clearly uneconomical.

Alternatively a proper syngas ratio between hydrogen and carbon monoxide from a multiple component gas stream containing hydrogen and carbon monoxide may also be produced from a PSA system by rejecting or recovering high purity hydrogen product and using the tail gas produced from the PSA unit in combination with a portion of the mixed gas feedstream to establish a mixed gas product having a desired syngas ratio of hydrogen and carbon monoxide. The tail gas effluent from the PSA system prior to such a combination, however, would have to be compressed such that its pressure is raised to the desired product pressure level. The compressor and PSA unit would have to be of a size and capacity large enough to accommodate a typical syngas feed supply which would make this alternative uneconomical as well.

A PSA unit has in the past been combined with a gas permeable membrane system to produce a high purity product essentially of a single gas component from a multi-component gas feed. In. U.S. Pat. No. 4,229,188, high purity hydrogen is recovered from a feed gas mixture containing hydrogen by passing the feed gas mixture to a selective adsorption unit to initially separate the hydrogen gas which is then further treated by a membrane system to recover additional quantity of hydrogen. Alternatively and as taught in U.S. Pat. Nos. 4,398,926 and 4,701,187, the feed gas mixture may initially be separated in a membrane separation unit to provide bulk separation of hydrogen. The separated hydrogen may then be passed to a PSA unit to achieve high purity hydrogen gas at high recovery. In U.S. Pat. No. 4,701,187, the tail gas purge stream from the PSA adsorption unit is also recycled back into the feed gas mixture to form an efficient system.

Accordingly, although the prior art teaches the combination of a membrane system with a PSA system to upgrade a low quality mixed gas stream in order to produce a high purity single component product, it is unknown to integrate a membrane system with a PSA system for producing a mixed gas product having an adjustably controlled gas ratio under varying and transient feedstream and operating conditions as well as a second high purity hydrogen product stream. It is also unknown to provide an integrated PSA and gas membrane system to produce a selected mixed gas product and a high purity single gas component product with essentially no loss of any of the gas components in the feedstream.

SUMMARY OF THE INVENTION

The integrated PSA and gas separation membrane process and system of the present invention provides for a mixed gas product and a high purity product stream with control over the ratio of gas components in the mixed product and essentially no loss of any of the feedstream components in the system i.e. with 100% recovery of all feedstream components.

The integrated PSA and gas separation membrane system of the present invention also incorporates a control subsystem to provide for the reliability of continuous thruput of the mixed gas product at the preset mixed gas ratio under circumstances where the PSA unit in the integrated system and/or compressor is temporarily inoperative or where the gas separation membrane unit is temporarily inoperative. The integrated system of the present invention will also operate under conditions of reduced performance of the gas membrane component in the gas separation membrane unit or reduced performance of the PSA unit or the tail gas compressor. Substantial flexibility is provided by blending the tail gas product effluent from the PSA unit with the non permeate effluent from the gas separation membrane unit in a closed loop system.

Accordingly, the present invention relates to a system for integrating a gas membrane separating unit having a gas permeable membrane with a pressure swing adsorption unit to produce a blended product of mixed gas components at a preset adjustably controlled gas ratio from a multi-gas component feedstream containing such components in which said separating unit includes an input to which said feedstream is applied, a first output for separating the more readily permeable gas components into a permeate feedstream and a second output for forming a mixed component feedstream of less readily permeable components; and wherein said pressure swing adsorption unit includes an adsorption bed in a pressure swing adsorption system having a feed input to which said permeate feedstream is applied, a tail gas output product of mixed permeate gas components and an output of a high purity gas; said system comprising:

means for analyzing said multi-gas component feedstream to determine the ratio of gas components in such feedstream; and adjustable control valve means connected to said permeate feedstream for presetting and adjustably controlling the gas ratio in said product of mixed gas components in response to said ratio of gas components in the multi gas component feedstream.

The present invention also relates to a process for integrating a permeable membrane separating unit having a gas permeable membrane with a pressure swing adsorption unit to produce a blended product of mixed gas components from a multi-gas component feedstream containing such gas components comprising the steps of:

directing said multi-gas component feedstream to said permeable membrane separating unit to separate said multi-gas component feedstream into a permeate feedstream of more readily permeable gas components and into a mixed component non-permeate feedstream of less readily permeable components;

passing said permeate feedstream to said pressure swing adsorption unit to produce a high purity gas component and a tail gas feedstream of mixed permeate gas components; and mixing said tail gas feedstream with said non permeate feedstream to form said blended product of mixed gas components.

BRIEF DESCRIPTION OF THE INVENTION

Additional advantages of the present invention will become apparent from the following detailed description of the invention when read in conjunction with the accompanying drawings of which:

FIG. 1 is a schematic drawing of the integrated system of the present invention; and FIG. 2 is a more detailed schematic of the integrated system of FIG. 1.

DETAILED DESCRIPTION OF THE INVENTION

Figure 1:
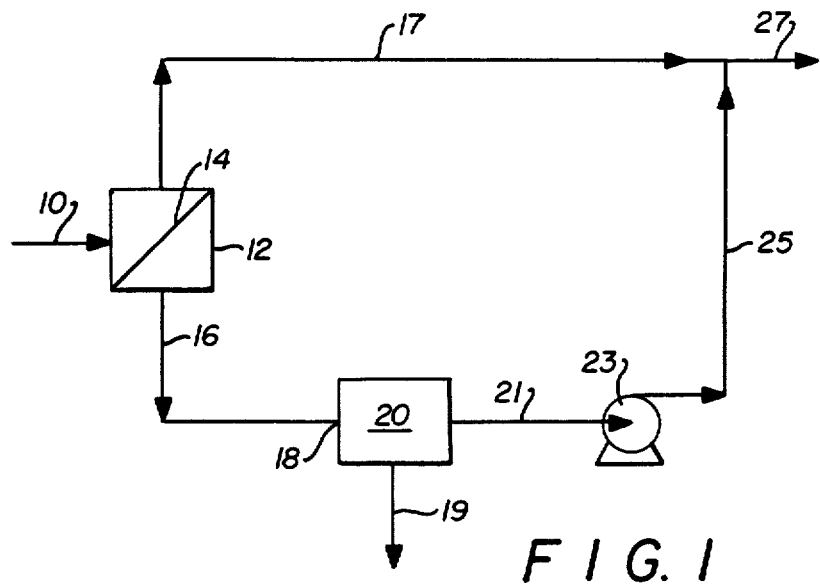

Referring now to FIG. 1 which illustrates the basic configuration of the integrated system of the present invention. A feed gas 10 is fed to a membrane separating unit 12 containing at least one gas permeable membrane 14. As one example the feed gas 10 may be a multi-component high pressure stream substantially of hydrogen and carbon monoxide in a ratio which is substantially higher in hydrogen content relative to the concentration of carbon monoxide. The feed gas 10 is supplied as a by-product from another process such as, for example, a steam reforming or partial oxidation operation resulting in a mixed hydrogen and carbon monoxide feed in a ratio of between 1.2 to 4.0 hydrogen to carbon monoxide and at a pressure of between 200 to 1000 psig and preferably between 300 to 600 psig.

The membrane separating unit 12 is designed for bulk separation of a permeable component from a mixed feed gas composition. The permeable membrane 14 may, e.g., comprise hollow fibers of a polysulfone material assembled in a structure to provide a gas stream 16 of permeate gas rich in hydrogen at reduced pressure and a high pressure outlet stream 17 containing a mixture of the feed constituents at a reduced hydrogen concentration relative to the feed concentration of hydrogen. Thus the outlet stream 17 will be composed of hydrogen and carbon monoxide in a ratio which will vary based upon the partial pressure difference across the membrane 14 and the flow rate of the input feed gas 10. The outlet stream 17 is generally referred to in the art as the non permeate gas stream. In commercial embodiments, the non permeate gas stream and the permeate gas stream are discharged at opposite ends of the separator unit 12, with the feed inlet positioned near the permeate gas outlet. In operation, the pressurized feed gas enters the separator, and hydrogen selectively permeates the hollow fiber walls. The hydrogen rich permeate gas passes through the interior of the fiber bores at reduced pressure and is delivered to the permeate gas outlet at one end of the separator, while non permeate gas passes to the outlet at the opposite end of the separator. The hydrogen rich permeate stream 16 is fed to the feed end 18 of a PSA unit 20.

The PSA process is of itself a well known means of separating and purifying a less readily adsorbable gas component contained in a feed gas mixture of said component with a more readily adsorbable second component, considered as an impurity or otherwise. Adsorption commonly occurs in multiple beds at an upper adsorption pressure, with the more selectively adsorbable second component thereafter being desorbed by pressure reduction to a lower desorption pressure. The beds may also be purged, typically at such lower pressure for further desorption and removal therefrom of said second component, i.e., the removal of impurities with respect to a high purity product gas, before repressurization of the beds to the upper adsorption pressure for the selective adsorption of said second component from additional quantities of the feed gas mixture as the processing sequence is carried out, on a cyclic basis, in each bed in the PSA system. Such PSA processing is disclosed in the Wagner patent, U.S. Pat. No. 3,430,418, and in the Fuderer et al patent, U.S. Pat. No. 3,986,849, wherein cycles based on the use of multi bed systems are described in detail. Such cycles are commonly based on the release of void space gas from the product end of each bed, in so called cocurrent depressurization step(s), upon completion of the adsorption step, with the released gas typically being employed for pressure equalization and for purge gas purposes. The bed is thereafter countercurrently depressurized and/or purged to desorb the more selectively adsorbed component of the gas mixture from the adsorbent and to remove such gas from the feed end of the bed prior to the repressurization thereof to the adsorption pressure.

The PSA system can be operated with at least one, and typically at least two adsorbent beds, as may be desirable in given applications, with from 3 to about 12 or more adsorbent beds commonly being employed in conventional practice.

A high purity output stream of hydrogen 19 is discharged at one end of the PSA unit 20. The PSA unit 20 also delivers an output stream 21 containing the desorbed impurities from the adsorption beds, which is generally referred to as "tail gas". The tail gas 21 issues at a relatively low pressure. The composition of the tail gas 21 is enriched in carbon monoxide relative to the permeate feed gas stream 18 to the PSA unit. A compressor 23 is used to raise the pressure of the tail gas stream 21 preferably to the pressure of the non permeate gas stream 17 from the membrane separation unit 12. The pressurized tail gas 25 is combined with the non-permeate gas stream 17 to form a blended product 27 at a predetermined gas ratio of hydrogen to carbon monoxide. The gas ratio of hydrogen to carbon monoxide in the blended product 27 is determined from control of the non-permeate gas stream 17 and mixed with the PSA tail gas 25.

Figure 2:
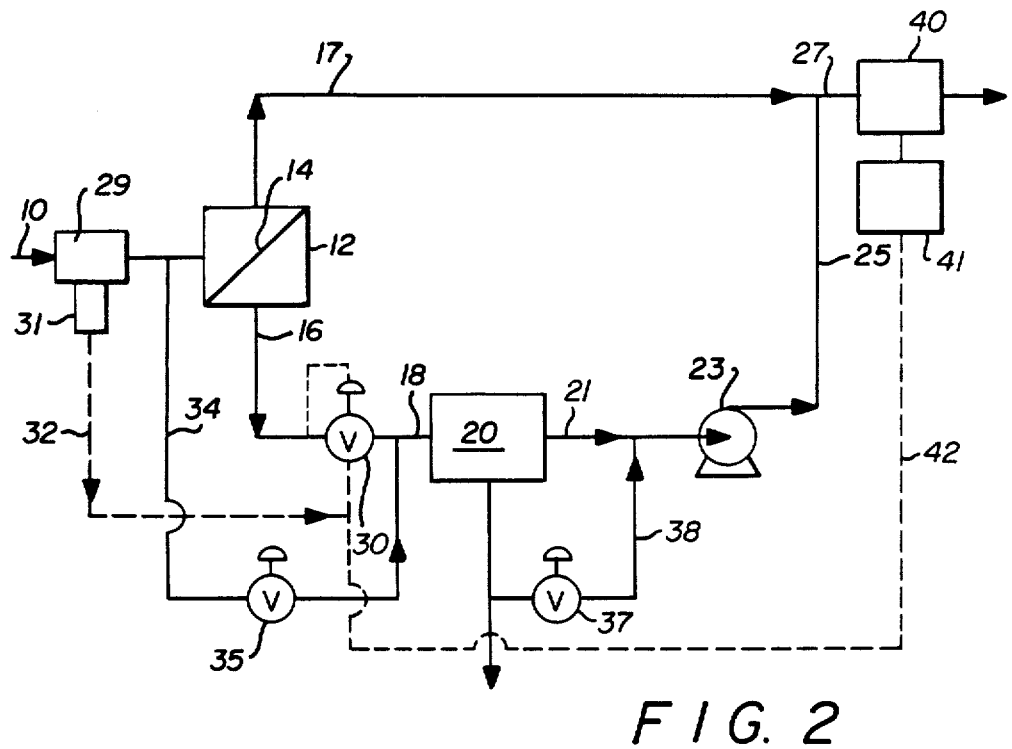

The preferred control arrangement for integrating the PSA and membrane units in accordance with the present invention is illustrated in FIG. 2. An adjustable control valve 30 is used to preset and adjustably control the gas ratio of the blended output product 27. Adjustment of the control valve 30 changes the back pressure on the permeate side of the gas permeable membrane 14 in the membrane separation unit 12 thereby changing the partial pressure differential across the membrane 14 and in turn, the permeation rate through the membrane 14 of the permeable components in the feed stream 10 i.e. the permeation rate of hydrogen through the membrane. The greater the partial pressure difference, or driving force, across the membrane the higher the permeation rate for a given membrane surface area and conversely the lower the partial pressure difference the lower the permeation rate for the same membrane surface area. Thus the control valve 30 can be adjusted to preset the blended output product 27 to establish a predetermined gas ratio between hydrogen and carbon monoxide of, e.g., 1:1.

Unless the ratio of gases in the mixed feed gas 10 to the membrane separation unit 12 remains fixed, which is unlikely, the control valve 30 must be adjusted with changes in the gas ratio or feed rate. This may be accomplished using conventional flow measurement and gas analysis techniques for the feed gas and adjusting the control valve 30 in response to changes in the gas ratio as well as feed rate to maintain a constant thruput for the blended output product 27 at the preset gas ratio of one to one. This may also be accomplished automatically by use of a gas analyzer 29 and a transducer 31 for providing a signal 32 to the control valve 30 for automatically adjusting the control valve 30 in response to changes in parameters in the feed gas such as the mole ratio of the feed gas components.

Additional control may be provided by bleeding a portion of the feed gas 10 around the gas separation unit 12 and into the feed input 18 of the PSA unit 20. The by-pass portion of feed gas is fed through conduit 34 to a point downstream of the control valve 30. An adjustable by-pass valve 35 is connected in line 34 to control the percentage of feed gas which is to by-pass the gas membrane separation unit 12. It is assumed that the PSA unit 20 is sized to accommodate the bulk separated permeate gas 16 and the unseparated by-pass flow in conduit 34.

The use of a by-pass flow improves the flexibility in the design of the membrane separating unit 12 for full capacity optimization of the permeable membrane 14 by reducing the load on the membrane surface area. Moreover, should the gas membrane separating unit 12 deteriorate in performance the by-pass valve 35 may be adjusted to place a greater load on the PSA unit 20 to maintain the blended output product 27 at full recovery and at the precise gas ratio of 1:1. The gas ratio in the blended output product 27 may be compensated for any change in the setting of valve 35 by adjustment of the control valve 30. Valve 35 may also be electronically linked to control valve 30 through a computer (not shown) which may be used to control the transducer 31 not only in response to the gas flow ratio in the gas feed but also to the amount of by-pass flow in conduit 34. Thus the control valve 27 may be automatically operated to respond not only to flow ratio changes in the feed gas but also to the percentage of unseparated by pass feed to the PSA unit.

The blended product 27 may also be fine tuned by adjustment of a bleed valve 37 in conduit 38. The conduit 38 provides a blend of excess purified hydrogen back into the tail gas stream. The proportion of hydrogen gas bled back into the tail gas is controlled by adjustment of bleed valve 37.

Additional feed back control is provided by placement of an analytical gas analyzer 40 in line with the blended product 27 for analyzing the syngas ratio of the blended product 27. The analyzer 40 may be fed through a computer control 41 for providing an output electrical signal 42 to the control valve 30 thereby providing an additional measure of control to assure accuracy of the syngas product 27. The analyzer 40 is intended to be used in conjunction with the analytical components 29 and 31 although it is possible to operate the system with feed back control independent of any feed forward control.

The integrated PSA and gas separation membrane system of the present invention provides the most efficient means of producing the mixed gas product 27 having a preset adjustably controlled gas ratio and a high purity second gas component. The system will continue to permit production of the mixed gas product at a controlled gas ratio even if the compressor 23 were to fail or if the PSA unit 20 were to fail or if the gas separation membrane unit 12 were to fail. If the compressor 23 or the PSA unit 20 were to fail the operation of the gas separation membrane unit 12 would remain under the control of the control valve 30 which would be directed to operate in a preprogramed preset failure mode of operation actuated by failure of the compressor 23 or PSA unit 20. If the gas separation membrane unit 12 fails the valve 35 would be adjusted to continue production of the mixed gas product 27 and high purity second gas component. In the latter case, to increase thruput additional input feed 10 can be fed to line 17 on a temporary basis during shutdown of unit 12.

What we claim is:

1. A process for integrating a permeable membrane separating unit having gas permeable membrane with a pressure swing adsorption unit to produce a blended product of mixed gas components from a multi-gas component feedstream containing such gas components comprising the steps of:

directing said multi-gas component feedstream to said permeable membrane separating unit to separate said multi-gas component feedstream into a permeate feedstream of more readily permeable gas components and into a mixed component non-permeate feedstream of less readily permeable components;

passing said permeate feedstream to said pressure swing adsorption unit to produce a high purity gas component and a tail gas feedstream of mixed permeate gas components; and mixing said tail gas feedstream with said non-permeate feedstream to form said blended product of mixed gas components.

2. A process as defined in claim 1 further comprising the steps of compressing said tail gas feedstream to a desired pressure level commensurate with said non-permeate feedstream.

3. A process as defined in claim 2 further comprising analyzing said multi-gas component feedstream to determine the ratio of the gas components in such feedstream; and adjusting the back pressure of said permeate feedstream in response to said ratio of gas components in the multi-gas component feedstream so as to preset and adjustably control said gas ratio in said blended product of mixed gas components.

4. A process as defined in claim 3 further comprising by-passing a portion of said multi-gas component feedstream around said gas membrane separating unit and into said pressure swing adsorption unit.

5. A process as defined in claim 4 further comprising bleeding a portion of high purity gas from said pressure swing adsorption unit back into said tail gas feedstream.

6. A process as defined in claims 1 or 4 further comprising analyzing said blended product of mixed gas components; and
adjusting the back pressure of said permeate feedstream in response to variations in the gas ratio of said blended product to control said gas ratio.

7. A system for integrating a gas membrane separating unit having a gas permeable membrane with a pressure swing absorption unit to produce a blended product of mixed gas components at a preset adjustably controlled gas ratio from a multi-gas component feedstream containing such components, in which said separating unit includes an input to which said feedstream is applied, a first output for separating the more readily permeable gas components into a permeate feedstream and a second output for forming a mixed component feedstream of less readily permeable components, and wherein said pressure swing adsorption unit includes an adsorption bed in a pressure swing adsorption system having a feed input to which said permeate feedstream is applied, a tail gas output product of mixed permeate gas components and an output of a high purity gas, said system comprising:
means for evaluating said multi-gas component feedstream to permit the determination of the ratio of gas components in such feedstream; and
adjustable control valve means connected to said permeate feedstream for presetting and adjustably controlling the gas ratio in said blended product of mixed gas components in response to said evaluation of gas components in the multi-gas component feedstream.

8. A system as defined in claim 7 further comprising means for compressing said tail gas output to a desired pressure level commensurate with said non-permeate feedstream.

9. A system as defined in claim 8 wherein said means for evaluating said multi-gas component feedstream includes flow detection means and analytical means for computing the gas flow ratio of components in said feedstream.

10. A system as defined in claim 7 wherein said adjustable control valve is responsive to said computed gas flow ratio of components in said multi-gas component feedstream for automatically adjusting said gas ratio in said blended product of mixed gas components.

11. A system as defined in claims 7 or 10 further comprising means for by-passing a portion of said multi-gas component feedstream around said gas membrane separating unit and downstream of said adjustable control valve means.

12. A system as defined in claim 11 further comprising a by-pass valve for adjusting said by-pass portion of said multi gas component feedstream.

13. A system as defined in claim 12 further comprising means for bleeding a portion of said high purity gas from said PSA unit back into said tail gas output product for providing further control over the gas ratio in said blended mixed gas product.

14. A system as defined in claim 11 further comprising means for analyzing said blended product of mixed gas components and for providing a signal to said control valve means corresponding to said analysis.

* * * * *